United States Patent
Park et al.

(10) Patent No.: US 10,948,075 B2
(45) Date of Patent: Mar. 16, 2021

(54) APPARATUS AND METHOD FOR CONTROLLING TRANSMISSION OF VEHICLE

(71) Applicants: HYUNDAI MOTOR COMPANY, Seoul (KR); KIA MOTORS CORPORATION, Seoul (KR)

(72) Inventors: Kwang Hee Park, Suwon-si (KR); Byeong Wook Jeon, Seoul (KR); Jae Chang Kook, Hwaseong-si (KR); Sang Jun Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 16/580,838

(22) Filed: Sep. 24, 2019

(65) Prior Publication Data

US 2020/0309259 A1 Oct. 1, 2020

(30) Foreign Application Priority Data

Mar. 29, 2019 (KR) .................. 10-2019-0036953

(51) Int. Cl.
*F16H 61/02* (2006.01)
*F16H 61/00* (2006.01)

(52) U.S. Cl.
CPC . *F16H 61/0213* (2013.01); *F16H 2061/0087* (2013.01); *F16H 2061/0223* (2013.01); *F16H 2061/0234* (2013.01); *F16H 2708/22* (2013.01)

(58) Field of Classification Search
CPC .... F16H 59/44; F16H 59/66; F16H 2059/666; F16H 61/0213; F16H 61/16; F16H 2061/0087; F16H 2061/009; F16H 2061/0093; F16H 2061/022; F16H 2061/0223; F16H 2061/0234; F16H 2061/163

See application file for complete search history.

(56) References Cited

U.S. PATENT DOCUMENTS 5,716,301 A * 2/1998 Wild ..................... G01C 21/26
477/97
7,469,178 B2 12/2008 Shiiba et al.
(Continued)

FOREIGN PATENT DOCUMENTS

| JP | 2005-226670 A | 8/2005 |
| JP | 2016-536549 A | 11/2016 |
| KR | 10-1756717 B1 | 7/2017 |

*Primary Examiner* — Edwin A Young
(74) *Attorney, Agent, or Firm* — Morgan, Lewis & Bockius LLP

(57) ABSTRACT

An apparatus and method for controlling a transmission of a vehicle, may include a determination device that determines whether a curve is present within a predetermined distance ahead of the vehicle, based on information regarding a road ahead of the vehicle, a calculation device that determines lateral acceleration of the vehicle based on information regarding the curve and information regarding a state of the vehicle and determines a pattern correction coefficient based on the predicted lateral acceleration, a pattern correction device that corrects a preset gear-shift pattern based on the pattern correction coefficient, and a controller that is configured to control the transmission based on the corrected gear-shift pattern when the vehicle enters the curve.

23 Claims, 12 Drawing Sheets

(56) References Cited

U.S. PATENT DOCUMENTS

| | | |
|---|---|---|
| 8,099,220 B2 | 1/2012 | Kim et al. |
| 9,297,455 B2 * | 3/2016 | Li .......................... F16H 61/00 |
| 10,030,767 B2 | 7/2018 | Riesenmey et al. |
| 2005/0187694 A1 | 8/2005 | Shiiba et al. |
| 2010/0030437 A1 * | 2/2010 | Kim ................... F16H 61/0213 |
| | | 701/65 |
| 2010/0041512 A1 * | 2/2010 | Silveri ..................... B60K 6/52 |
| | | 477/3 |
| 2010/0100293 A1 * | 4/2010 | Takanami .......... F16H 61/0213 |
| | | 701/65 |
| 2016/0348786 A1 | 12/2016 | Riesenmey et al. |
| 2019/0263368 A1 * | 8/2019 | Takahashi ............... B60T 8/171 |

* cited by examiner

APPARATUS AND METHOD FOR CONTROLLING TRANSMISSION OF VEHICLE

CROSS-REFERENCE TO RELATED APPLICATION

The present application claims priority to Korean Patent Application No. 10-2019-0036953, filed on Mar. 29, 2019, the entire contents of which is incorporated herein for all purposes by this reference.

BACKGROUND OF THE INVENTION

Field of the Invention

The present invention relates to an apparatus and method for controlling a transmission of a vehicle.

Description of Related Art

An automatic transmission is an apparatus that automatically controls gear according to a driving situation and a driver's will to accelerate a vehicle and provides driver convenience.

The automatic transmission controls gear based on a gear-shift pattern which is determined according to a vehicle speed and an accelerator pedal position.

The gear control method in the related art does not reflect a varying road condition and a driving situation because the gear is determined according to the vehicle speed and the accelerator pedal position.

For example, a gear-shift pattern determined when the vehicle travels on a straight section in a road may be identically applied when the vehicle travels along a curve in the road.

In the case where the existing gear-shift pattern is reflected when the vehicle travels along the curve, the automatic transmission may up-shift into a higher gear in an OFF state of an accelerator pedal to increase the driver's uncomfortable feeling.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission control apparatus and method for correcting a gear-shift pattern according to lateral acceleration predicted based on the speed of a vehicle and the curvature of a curve ahead of the vehicle, improving an engine brake effect and re-acceleration responsiveness as well as facilitating the vehicle to stably travel along the curve.

Various aspects of the present invention provide a transmission control apparatus and method for interrupting control of a transmission in an OFF state of an accelerator pedal before a vehicle enters a curve, preventing an up-shift during travel of the vehicle along the curve.

The technical problems to be solved as an exemplary embodiment of the present invention are not limited to the aforementioned problems, and any other technical problems not mentioned herein will be clearly understood from the following description by those skilled in the art to which an exemplary embodiment of the present invention pertains.

According to various aspects of the present invention, an apparatus of controlling a transmission of a vehicle includes a determination device that determines whether a curve is present within a predetermined distance ahead of the vehicle, based on information regarding a road ahead of the vehicle, a calculation device that determines predicted lateral acceleration of the vehicle based on information regarding the curve and information regarding a state of the vehicle and determines a pattern correction coefficient based on the predicted lateral acceleration, a pattern correction device that corrects a preset gear-shift pattern based on the pattern correction coefficient, and a controller that is configured to control the transmission based on the corrected gear-shift pattern when the vehicle enters the curve.

The determination device may determine whether the curve satisfies a predetermined curve condition, based on a sectional distance and curvature information related to the curve.

The determination device may determine whether a driving situation of the vehicle satisfies an up-shift prohibition condition, based on vehicle speed information when the curve satisfies the predetermined curve condition.

The controller may interrupt the control of the transmission in an OFF state of an accelerator pedal when it is determined that the driving situation of the vehicle satisfies the up-shift prohibition condition.

The determination device may determine whether the vehicle reaches a predicted gear-shift point before arriving at a start point of the curve, when the curve satisfies the predetermined curve condition.

The predicted gear-shift point may be a point in which the vehicle is predicted to reach at predetermined time before reaching the start point of the curve.

The calculation device may determine the predicted lateral acceleration of the vehicle based on a vehicle speed at a point in which the vehicle is predicted to reach at predetermined time before reaching the predicted gear-shift point and the curvature of the curve, when the vehicle reaches the predicted gear-shift point.

The calculation device may determine the pattern correction coefficient based on a difference between the predicted lateral acceleration and a lower reference value of lateral acceleration and a difference between the lower reference value and an upper reference value of the lateral acceleration.

The pattern correction coefficient may be defined to be a value between 0 and 1.

The gear-shift pattern may be determined to be a first gear-shift pattern based on a normal mode when the pattern correction coefficient is 0, a second gear-shift pattern based on a sports mode when the pattern correction coefficient is 1, or a third gear-shift pattern based on a curve when the pattern correction coefficient is greater than 0 and smaller than 1.

The pattern correction device may move a current gear-shift pattern with respect to the first gear-shift pattern by a value provided by multiplying a difference between the second gear-shift pattern and the first gear-shift pattern by the pattern correction coefficient, when the gear-shift pattern is determined to be the third gear-shift pattern.

The controller may return the corrected gear-shift pattern to the previous gear-shift pattern when the vehicle completely passes through the curve.

The determination device may determine whether a continuous curve is present in the road ahead of the vehicle, when the vehicle completely passes through the curve.

The determination device may determine that the continuous curve is present in the road ahead of the vehicle, when the next curve is present within a reference distance and a speed of the vehicle is higher than or equal to a reference speed after the vehicle passes through the curve.

The controller may maintain the corrected gear-shift pattern when it is determined that the continuous curve is present in the road ahead of the vehicle.

The controller may return the corrected gear-shift pattern to the previous gear-shift pattern when it is determined that no continuous curve is present in the road ahead of the vehicle.

The apparatus according to an exemplary embodiment of the present invention may further include a communication device that receives the information regarding the curve in the road ahead of vehicle from a navigation system.

According to various aspects of the present invention, a method for controlling a transmission of a vehicle includes determining whether a curve is present within a predetermined distance ahead of the vehicle, based on information regarding a road ahead of the vehicle, determining predicted lateral acceleration of the vehicle based on information regarding the curve and information regarding a state of the vehicle and determining a pattern correction coefficient based on the predicted lateral acceleration, correcting a preset gear-shift pattern based on the pattern correction coefficient, and controlling the transmission based on the corrected gear-shift pattern when the vehicle enters the curve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
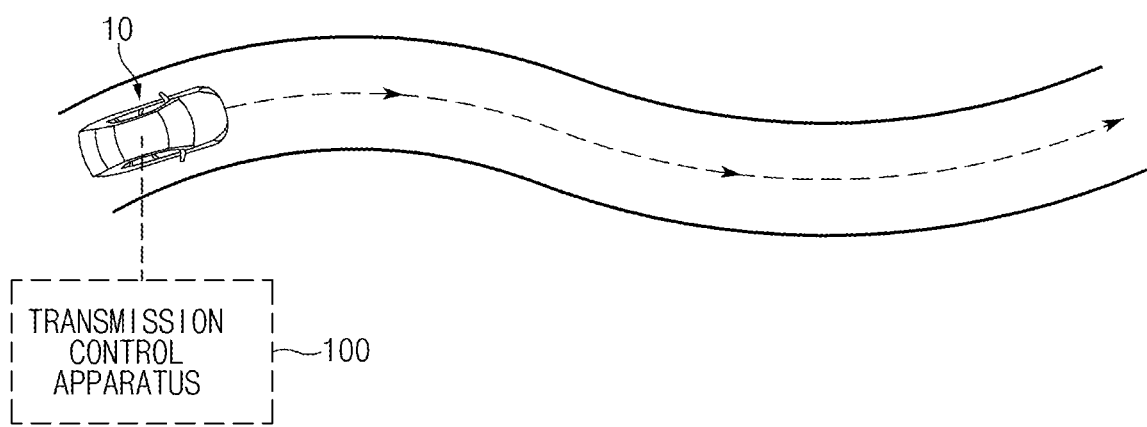
FIG. 1 is a view exemplarily illustrating a vehicle to which a transmission control apparatus according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which an exemplary embodiment of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus and method for controlling a transmission of a vehicle according to the present invention relates to a technology for automatically controlling the transmission during travel of the vehicle, and any vehicle having an automatic gear-shift function implemented therein may be applied to the present invention.

FIG. 1 is a view exemplarily illustrating a vehicle to which a transmission control apparatus according to an exemplary embodiment of the present invention is applied.

Referring to FIG. 1, the transmission control apparatus 100 may control a transmission of the vehicle 10 based on a gear-shift pattern determined during travel of the vehicle 10. At the instant time, the transmission control apparatus 100 may obtain information regarding a road ahead of vehicle from one or more sensors and/or a navigation system during the travel of the vehicle 10 and may determine the gear-shift pattern in consideration of an obtained road condition and/or a driving situation. Accordingly, the transmission control apparatus 100 according to an exemplary embodiment of the present invention may improve forward driving stability and may allow a driver to feel a sense of natural gear-shift.

A detailed configuration and operations of the transmission control apparatus 100 will be described below in detail with reference to FIG. 2.

The transmission control apparatus 100 according to an exemplary embodiment of the present invention may be implemented inside the vehicle 10. At the instant time, the transmission control apparatus 100 may be integrated with control units inside the vehicle 10. Meanwhile, the transmission control apparatus 100 may be implemented as a separate apparatus and may be connected to the control units of the vehicle 10 by separate connecting devices.

Figure 2:
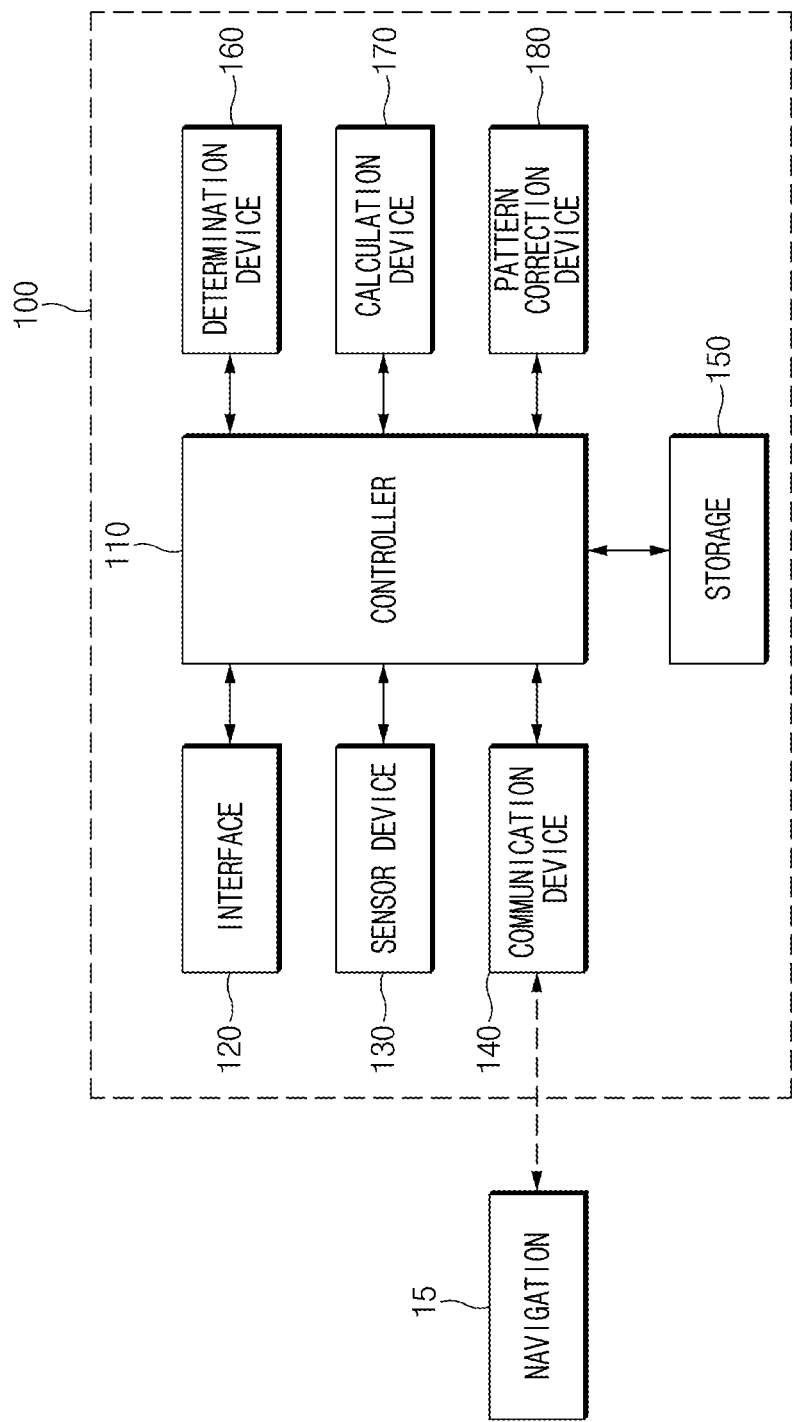
FIG. 2 is a view exemplarily illustrating a configuration of the transmission control apparatus according to an exemplary embodiment of the present invention.

FIG. 2 is a view exemplarily illustrating a configuration of the transmission control apparatus according to an exemplary embodiment of the present invention.

Referring to FIG. 2, the apparatus 100 may include a controller 110, an interface 120, a sensor device 130, a communication device 140, storage 150, a determination device 160, a calculation device 170, and a pattern correction device 180. Here, the controller 110, the determination device 160, the calculation device 170, and the pattern correction device 180 of the transmission control apparatus 100 according to the present exemplary embodiment of the present invention may be implemented as at least one processor.

The interface 120 may include an input device configured for receiving a control command from a user and an output device configured for outputting operational states and outcomes of the transmission control apparatus 100.

Here, the input device may include a key button and may include a mouse, a joystick, a jog shuttle, a stylus pen, or the like. Furthermore, the input device may include a soft key implemented on a display.

The output device may include a display and may include a sound output device such as a speaker. In the case where the display is provided with a touch sensor such as a touch film, a touch sheet, or a touch pad, the display may operate as a touch screen and may be implemented in the form in which the input device and the output device are integrated with each other.

The display may include at least one of a liquid crystal display (LCD), a thin film transistor-liquid crystal display (TFF LCD), an organic light-emitting diode (OLED) display, a flexible display, a field emission display (FED), and a three-dimensional (3D) display.

The sensor device 130 may include one or more sensors that detect information regarding roads around the vehicle 10. For example, the sensor device 130 may include a Global Positioning System (GPS) sensor for detecting whether a curve is present ahead of vehicle and/or curvature information related to the curve ahead of the vehicle.

Furthermore, the sensor device 130 may further include a sensor that measures the speed and/or accelerator position sensor (APS) of the vehicle 10.

The communication device 140 may include a communication module for in-vehicle network communication with electronic units and/or control units included in the vehicle 10. The communication module may be communicatively coupled with a navigation system 15 included in the vehicle 10 and may receive information regarding a road ahead of vehicle from the navigation system 15. For example, the communication module may receive the position, the sectional distance, and the curvature information related to a curve ahead of the vehicle.

Furthermore, the communication module may receive driving data (e.g., the speed, the acceleration, the APS, and the like) of the vehicle 10 from sensors included in the vehicle 10. Here, the in-vehicle network communication technology may include controller area network (CAN) communication, local interconnect network (LIN) communication, Flex-Ray communication, or the like.

Furthermore, the communication device 140 may further include a communication module that supports wireless Internet access and/or a communication module that supports short range communication. Here, the wireless Internet technology may include wireless LAN (WLAN), wireless broadband (Wibro), Wi-Fi, Worldwide Interoperability for Microwave Access (WiMAX), or the like. The short range communication technology may include Bluetooth, ZigBee, ultra-wideband (UWB), radio frequency identification (RFID), infrared data association (IrDA), or the like.

The storage 150 may store data and/or an algorithm required for the transmission control apparatus 100 to operate.

Furthermore, the storage 150 may store information regarding a road ahead of vehicle which is obtained through the navigation system 15 and/or the sensor device 130, and may store driving data of the vehicle 10 which is obtained during travel of the vehicle 10. Moreover, the storage 150 may store vehicle states and/or gear-shift patterns according to road conditions. Furthermore, the storage 150 may store condition information which is applied to determine a gear-shift pattern.

The storage 150 may store one or more commands and/or algorithms for determining predicted lateral acceleration based on the speed of the vehicle 10 and a curvature, determining a pattern correction coefficient, and correcting a gear-shift pattern based on the pattern correction coefficient. Furthermore, the storage 150 may store a command and/or an algorithm for controlling the transmission of the vehicle 10 according to a gear-shift pattern during travel of the vehicle 10.

Here, the storage 150 may include a storage medium such as a random access memory (RAM), a static random access memory (SRAM), a read-only memory (ROM), a programmable read-only memory (PROM), or an electrically erasable programmable read-only memory (EEPROM).

The determination device 160 determines whether a curve is present within a predetermined distance ahead of the vehicle, based on information regarding a road ahead of vehicle which is obtained by the navigation system 15 and/or the sensor device 130. Furthermore, when it is determined that a curve is present within the predetermined distance ahead of the vehicle, the determination device 160 may determine whether the curve satisfies a predetermined curve condition, based on the sectional distance and curvature information related to the corresponding curve.

At the present time, the determination device 160 may determine whether the vehicle 10 reaches a first point at first time before arrival at the start point of the curve, whether the vehicle 10 reaches a second point at second time before arrival at the start point of the curve, whether the vehicle 10 reaches a third point at third time before arrival at the start point of the curve, and whether the vehicle 10 reaches a fourth point which is the start point of the curve. Here, the second time refers to the time which is shorter than the first time and longer than the third time. Furthermore, the first point is a point which is farthest away from the start point of the curve, the second point is a point between the first point and the third point, and the third point is a point between the second point and the fourth point. An exemplary embodiment of the present invention relating to these points will be described below with reference to FIG. 3.

Figure 3:
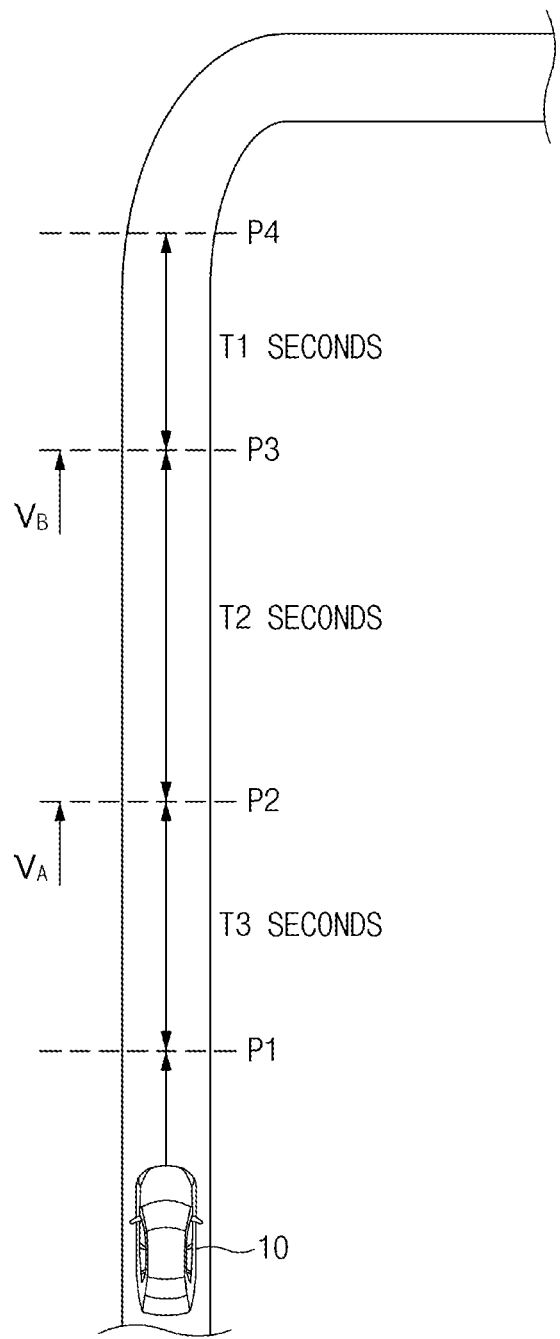
FIG. 3, FIG. 4, FIG. 5, FIG. 6, FIG. 7A, FIG. 7B, and FIG. 7C are views illustrating embodiments referred to in describing operations of the transmission control apparatus according to an exemplary embodiment of the present invention.

Referring to FIG. 3, a first point P1 is a point in which the vehicle 10 reaches at first time (=T1+T2+T3) before arrival at a fourth point P4 which is the start point of a curve. For example, the first point P1 may be a point in which the vehicle 10 reaches at seven seconds before arrival at the fourth point P4. When the vehicle 10 reaches the first point P1, the determination device 160 may determine whether the curve ahead of vehicle satisfies a predetermined curve condition.

A second point P2 is a point in which the vehicle 10 reaches at second time (=T1+T2) before arrival at the fourth point P4 which is the start point of the curve. For example, the second point P2 may be a point in which the vehicle 10 reaches at five seconds before arrival at the fourth point P4. The determination device 160 may determine whether a driving situation at the time when the vehicle 10 reaches the second point P2 satisfies an up-shift prohibition condition.

For example, when the curve ahead of vehicle satisfies the predetermined curve condition and the vehicle speed at the time when the vehicle 10 passes through the first point P1 is higher than or equal to a reference speed (e.g., 10 kph), the determination device 160 may determine that the driving situation of the vehicle 10 satisfies the up-shift prohibition condition. The determination device 160 transfers the determination result to the controller 110.

When the determination device 160 determines that the driving situation of the vehicle 10 satisfies the up-shift prohibition condition, the controller 110 may interrupt control of the transmission in an OFF state of an accelerator pedal to prohibit an up-shift.

A third point P3 is a point in which the vehicle 10 reaches at third time (=T1) before arrival at the fourth point P4 which is the start point of the curve. For example, the third point P3 may be a point in which the vehicle 10 reaches at two seconds before arrival at the fourth point P4. Here, the third point P3 may be a predicted gear-shift point.

The determination device 160 may determine whether a driving situation at the time when the vehicle 10 reaches the third point P3 satisfies a gear-shift condition.

For example, in the case where the curve ahead of vehicle satisfies the predetermined curve condition when the vehicle 10 reaches the third point P3, the determination device 160 may determine that the driving situation of the vehicle 10 satisfies the gear-shift condition. The determination device 160 may transfer the determination result to the controller 110, the calculation device 170, and/or the pattern correction device 180.

When it is determined that the driving situation at the time when the vehicle 10 reaches the third point P3 satisfies the gear-shift condition, the controller 110 determines to correct (move) a gear-shift pattern. The controller 110 may transmit control signals to the calculation device 170 and the pattern correction device 180 to correct the gear-shift pattern.

The calculation device 170 determines predicted lateral acceleration based on the vehicle speed VA at the time when the vehicle 10 passes through the second point P2. Here, the calculation device 170 may determine the predicted lateral acceleration with reference to Equation 1 below.

$$G_{y\_predict} = k \times \frac{v^2}{R} \qquad \text{[Equation 1]}$$

In Equation 1, $G_{y\_predict}$ denotes the predicted lateral acceleration, $V_A$ denotes the vehicle speed at the time when the vehicle 10 passes through the second point P2, R denotes the curvature of the curve, and k denotes an arbitrary coefficient. Here, k may be varied according to road and vehicle conditions.

When the predicted lateral acceleration is completely determined from Equation 1, the calculation device 170 determines a pattern correction coefficient based on the predicted lateral acceleration determined. The calculation device 170 may determine the pattern correction coefficient by use of the predicted lateral acceleration determined and lower and upper reference values of lateral acceleration.

$$K = \frac{1}{B-A} \times (G_{y\_predict} - A) \qquad \text{[Equation 2]}$$

In Equation 2, K denotes the pattern correction coefficient, $G_{y\_predict}$ denotes the predicted lateral acceleration, A denotes the lower reference value of the lateral acceleration, and B denotes the upper reference value of the lateral acceleration. Here, K may be defined as a number of 0 or more.

Figure 4:
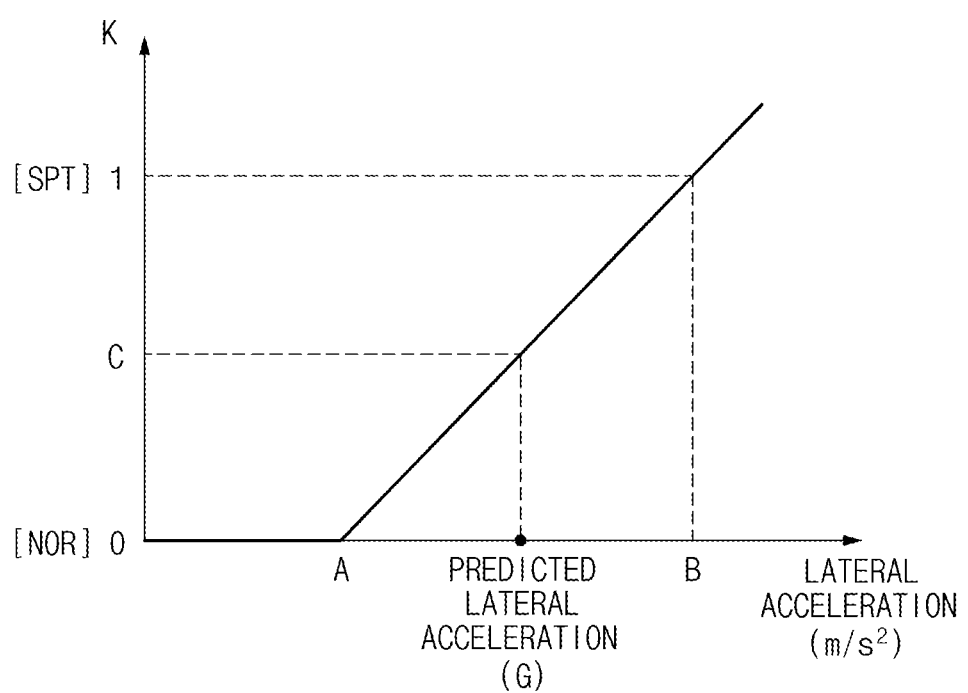

The pattern correction coefficient according to the predicted lateral acceleration may be defined as shown in the graph of FIG. 4.

Referring to FIG. 4, the pattern correction coefficient K has a value of 0 when the predicted lateral acceleration reaches the lower reference value "A". The gear-shift pattern in the state in which the pattern correction coefficient K=0 may be determined to be a normal pattern $P_{NOR}$.

Furthermore, the pattern correction coefficient K has a value of 1 when the predicted lateral acceleration reaches the upper reference value "B". The gear-shift pattern in the state in which the pattern correction coefficient K=1 may be determined to be a sports pattern $P_{SPT}$.

Meanwhile, the pattern correction coefficient K has a value of C (here, 0<C<1) when the predicted lateral acceleration is between the lower reference value "A" and the upper reference value "B". In the instant case, the gear-shift pattern may be determined to be a curve pattern.

Accordingly, the pattern correction device 180 corrects (moves) the gear-shift pattern, based on the pattern correction coefficient determined by the calculation device 170.

At the present time, the pattern correction device 180 may correct the gear-shift pattern with reference to Equation 3 below.

$$P_{CURVE} = P_{NOR} + (P_{SPT} - P_{NOR}) \times K \qquad \text{[Equation 3]}$$

An exemplary embodiment of the present invention relating to the correction (movement) of the gear-shift pattern will be described below with reference to FIG. 5.

Figure 5:
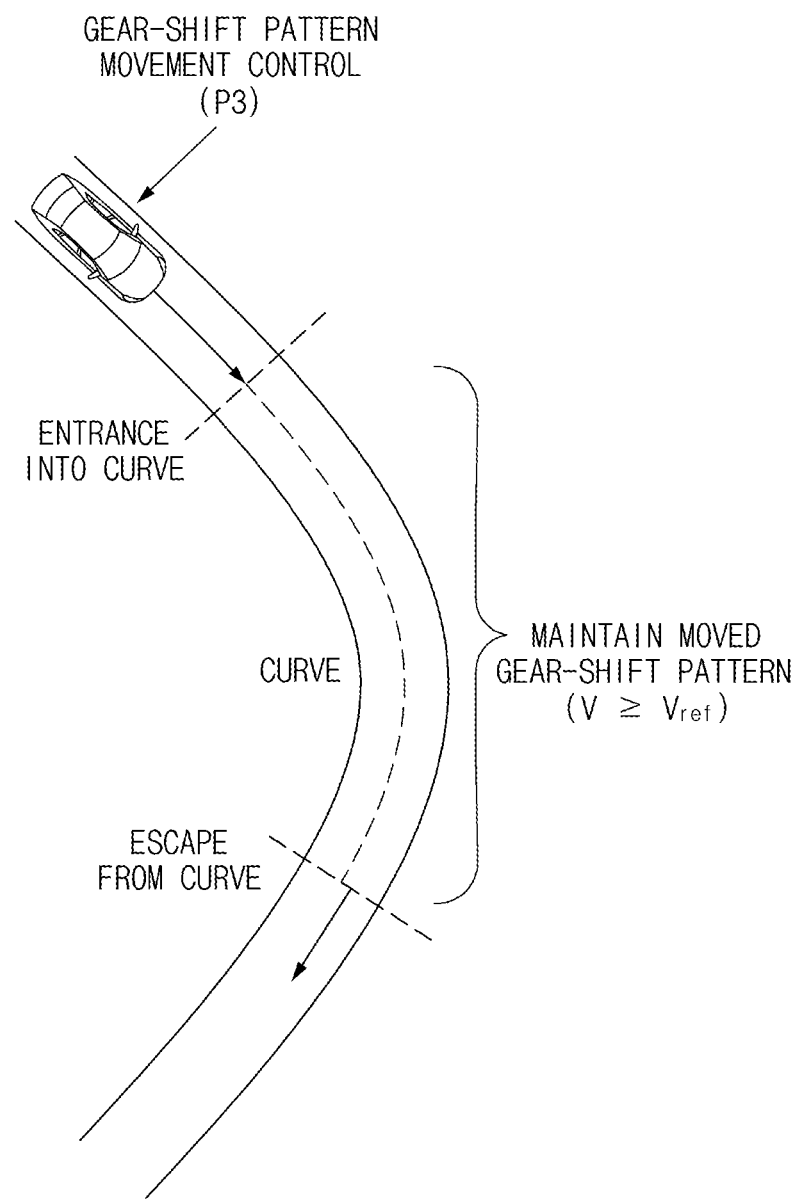

Referring to FIG. 5, when it is assumed that the current gear-shift pattern is a normal pattern $P_{NOR}$, the pattern correction device 180 may move the current gear-shift pattern by "$(P_{SPT}-P_{NOR}) \times K$" with respect to the normal pattern $P_{NOR}$.

Meanwhile, the fourth point P4 of FIG. 3 is the start point of the curve. The controller 110 controls the transmission based on the gear-shift pattern corrected (moved) by the pattern correction device 180, from when the vehicle 10 reaches the fourth point P4 to when the vehicle 10 completely passes through the curve. For example, until the vehicle 10 passes through the curve, the controller 110 may control the transmission based on a curve pattern $P_{CURVE}$ corrected (moved) as illustrated in FIG. 5.

Figure 6:
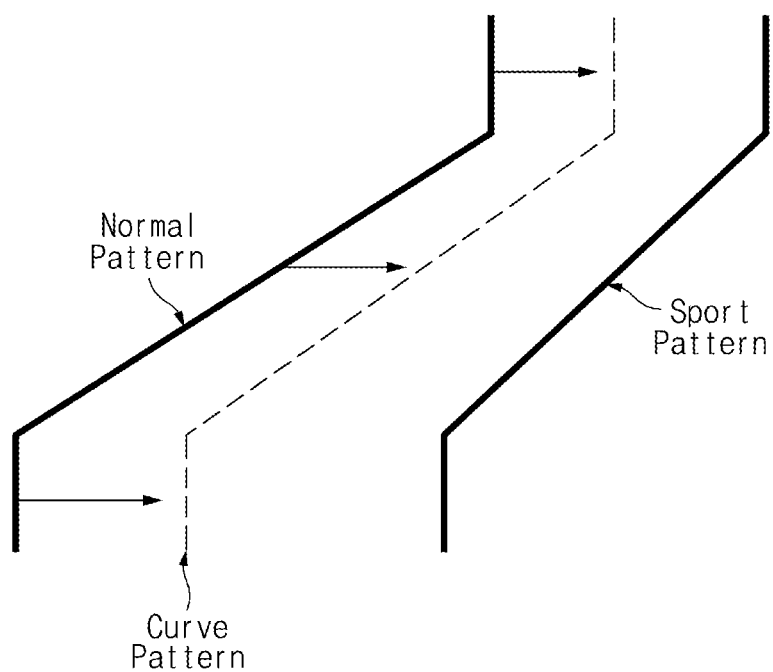

Here, the determination device 160 may determine whether a driving situation of the vehicle 10 during travel of the vehicle 10 along the curve satisfies a gear-shift pattern movement condition. For example, the determination device 160 may determine whether the driving situation of the vehicle 10 satisfies the gear-shift pattern movement condition, depending on whether the vehicle speed remains at the reference speed or greater while the vehicle 10 travels along the curve. Here, when the vehicle speed is lower than the reference speed, the determination device 160 may determine that the driving situation of the vehicle 10 does not satisfy the gear-shift pattern movement condition. Accordingly, as illustrated in the exemplary embodiment of FIG. 6, the controller 110 may control the transmission according to the corrected gear-shift pattern while the vehicle 10 travels along the curve, and when the gear-shift pattern movement condition is not satisfied while the vehicle 10 travels along the curve, the controller 110 may return the gear-shift pattern to the normal pattern which is the existing gear-shift pattern.

Furthermore, when the vehicle 10 completely passes through the curve, the controller 110 may return the gear-shift pattern to the normal pattern which is the existing gear-shift pattern.

When the vehicle 10 completely passes through the curve, the determination device 160 may determine whether a continuous curve is present or not. When it is determined that no continuous curve is present, the controller 110 may return the gear-shift pattern to the normal pattern which is the existing gear-shift pattern.

Meanwhile, when it is determined that a continuous curve is present after the passage of the vehicle 10 through the curve, the controller 110 may continue to maintain the corrected (moved) gear-shift pattern.

Here, the determination device 160 may determine a presence or absence of a continuous curve, based on the distance between the end point of the curve and the start point of the next curve and the vehicle speed.

An exemplary embodiment of the present invention relating to determination of a continuous curve will be described below with reference to FIGS. 7A, B, and 7C.

Figure 7A:
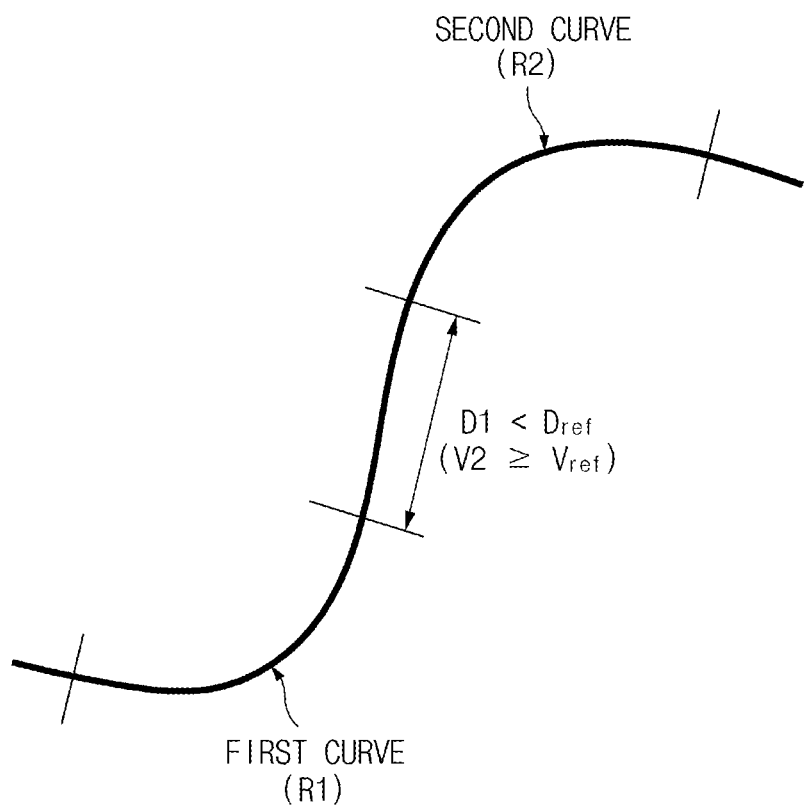

FIG. 7A illustrates an exemplary embodiment in which the distance D1 between the end point of a first curve R1 and the start point of a second curve R2 is shorter than a reference distance $D_{ref}$ and the vehicle speed V1 is higher than or equal to a reference speed $V_{ref}$.

In the case of FIG. 7A, a distance condition and a speed condition are all satisfied because the distance D1 between the end point of the first curve R1 and the start point of the second curve R2 is shorter than the reference distance $D_{ref}$ and the vehicle speed V1 is higher than or equal to the reference speed $V_{ref}$.

Accordingly, the determination device 160 may determine the second curve R2 to be a continuous curve. The controller 110 continues to maintain the corrected gear-shift pattern according to the determination result of the determination device 160 even after the vehicle 10 passes through the first curve R1.

Figure 7B:
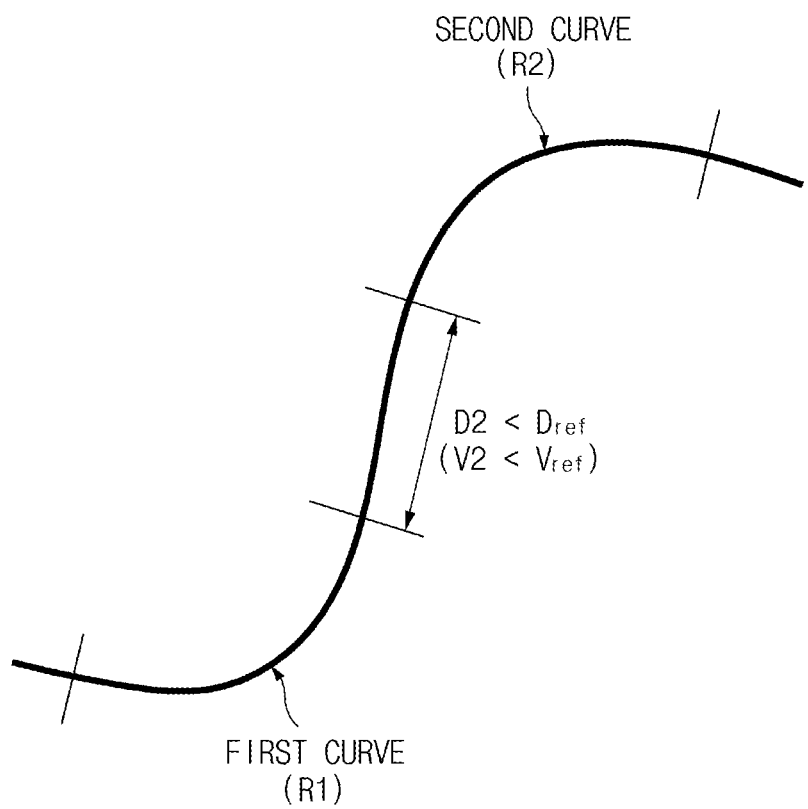

FIG. 7B illustrates an exemplary embodiment in which the distance D2 between the end point of the first curve R1 and the start point of the second curve R2 is shorter than the reference distance $D_{ref}$ and the vehicle speed V2 is lower than the reference speed $V_{ref}$.

In the case of FIG. 7B, a distance condition is satisfied because the distance D2 between the end point of the first curve R1 and the start point of the second curve R2 is shorter than the reference distance $D_{ref}$, whereas a speed condition is not satisfied because the vehicle speed V2 is lower than the reference speed $V_{ref}$.

Accordingly, the determination device 160 may determine that the second curve R2 is not a continuous curve. The controller 110 may return the corrected gear-shift pattern to the existing normal pattern according to the determination result of the determination device 160 after the vehicle 10 passes through the first curve R1.

Figure 7C:
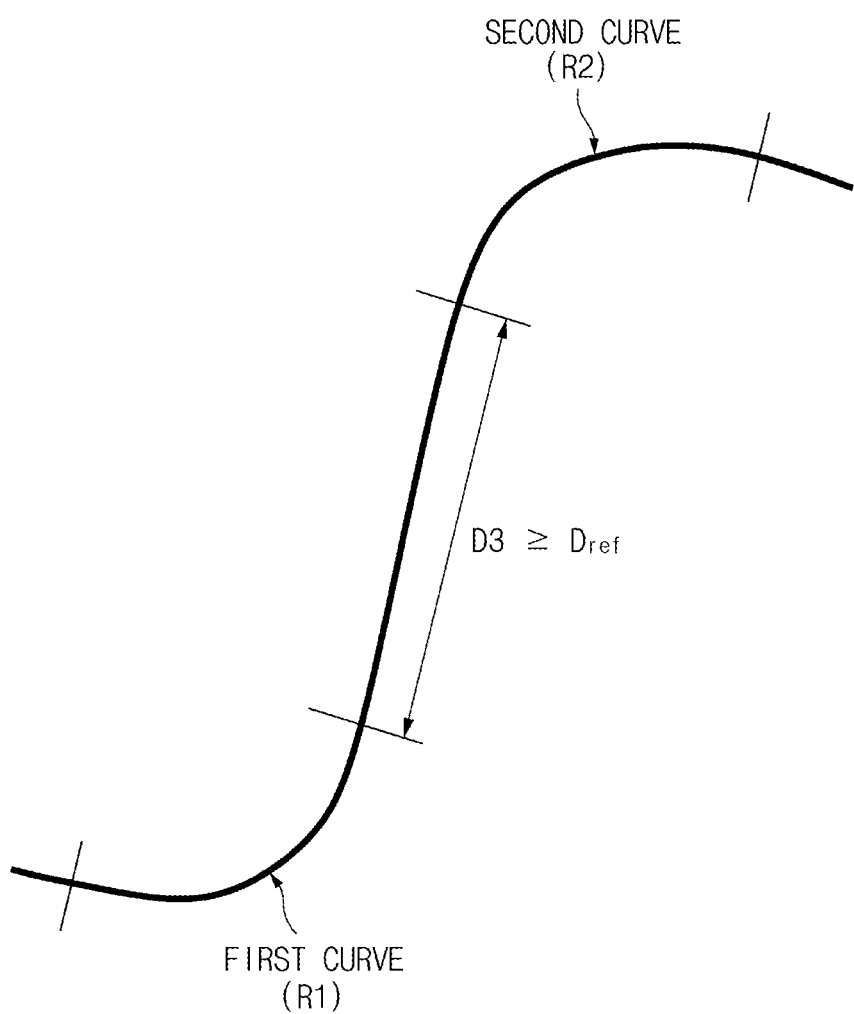

FIG. 7C illustrates an exemplary embodiment in which the distance D3 between the end point of the first curve R1 and the start point of the second curve R2 is longer than or equal to the reference distance $D_{ref}$ and the vehicle speed V3 is higher than or equal to the reference speed $V_{ref}$.

In the case of FIG. 7C, a speed condition is satisfied because the vehicle speed V3 is higher than or equal to the reference speed $V_{ref}$, whereas a distance condition is not satisfied because the distance D3 between the end point of the first curve R1 and the start point of the second curve R2 is longer than or equal to the reference distance $D_{ref}$.

Accordingly, the determination device 160 may determine that the second curve R2 is not a continuous curve. The controller 110 may return the corrected gear-shift pattern to the existing normal pattern according to the determination result of the determination device 160 after the vehicle 10 passes through the first curve R1.

As described above, the transmission control apparatus 100 according to an exemplary embodiment of the present invention determines a gear-shift pattern according to a road condition ahead of vehicle of the vehicle 10 and a state of the vehicle 10 when the vehicle 10 enters a curve or after the vehicle 10 passes through the curve, whereby the transmission control apparatus 100 may prevent an excessive up-shift during travel of the vehicle 10 along the curve and may improve driver satisfaction with driving.

The transmission control apparatus 100 according to the exemplary embodiment of the present invention, which operates as described above, may be implemented in a form of an independent hardware device that includes a memory and a processor for processing each operation, and may be driven in the form included in another hardware device such as a microprocessor or a generic-purpose computer system.

Operations of the above-configured transmission control apparatus 100 according to an exemplary embodiment of the present invention will be described below in more detail.

Figure 8:
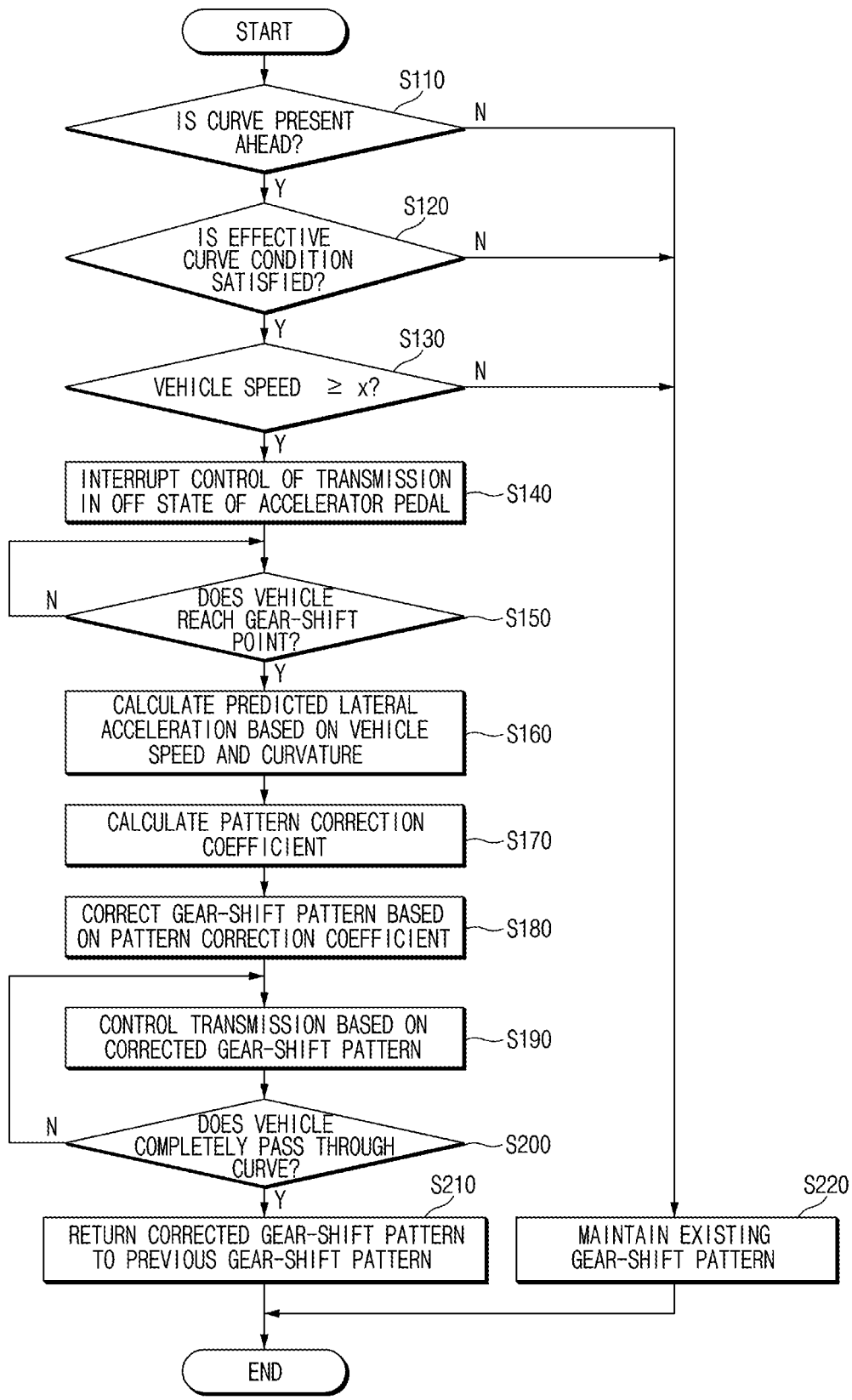
FIG. 8 and FIG. 9 are flowcharts illustrating a transmission control method according to an exemplary embodiment of the present invention.
Figure 9:
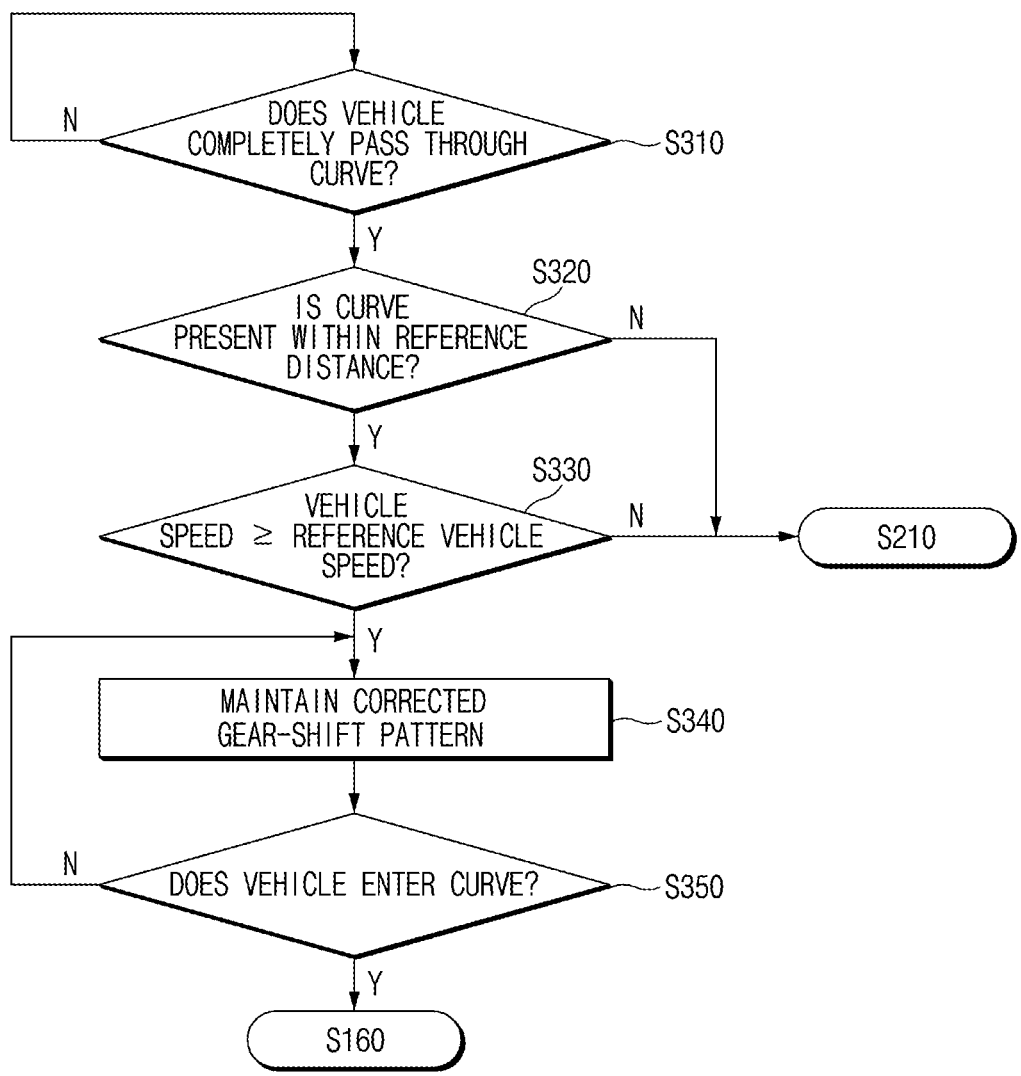

FIG. 8 and FIG. 9 are flowcharts illustrating a transmission control method according to an exemplary embodiment of the present invention.

Referring to FIG. 8, the transmission control apparatus 100 determines whether a curve is present within a predetermined distance ahead of the vehicle, based on information regarding a road ahead of vehicle which is obtained from the navigation system 15 and/or sensors, and when it is determined that a curve is present ahead of vehicle (S110), the transmission control apparatus 100 determines whether the corresponding curve satisfies a predetermined curve condition (S120). Here, the transmission control apparatus 100 may perform process S120 when the vehicle 10 reaches the first point P1 of FIG. 3.

When it is determined in process S120 that the corresponding curve satisfies the predetermined curve condition, the transmission control apparatus 100 interrupts control of the transmission in an OFF state of the accelerator pedal to prevent an up-shift in the OFF state of the accelerator pedal, in the case where the current vehicle speed of the vehicle 10 is higher than or equal to a reference speed x (S140). Here, the transmission control apparatus 100 may perform processes S130 and S140 when the vehicle 10 reaches the second point P2 of FIG. 3.

When the vehicle 10 reaches a predicted gear-shift point, that is, the third point P3 of FIG. 3 (S150), the transmission control apparatus 100 determines predicted lateral acceleration based on the vehicle speed and the curvature of the curve (S160) and determines a pattern correction coefficient based on the predicted lateral acceleration determined in process S160 (S170). At the instant time, the transmission control apparatus 100 may correct (move) a gear-shift pattern based on the pattern correction coefficient determined in process S170 (S180).

The transmission control apparatus 100 controls the transmission based on the gear-shift pattern corrected (moved) in process S180 (S190). Here, the transmission control apparatus 100 may control the transmission while maintaining the corrected gear-shift pattern until the vehicle 10 completely passes through the curve.

When the vehicle 10 completely passes through the curve (S200), the transmission control apparatus 100 returns the corrected gear-shift pattern to the previous gear-shift pattern (S210).

Meanwhile, when the curve ahead of vehicle does not satisfy the predetermined curve condition or the vehicle speed is lower than the reference speed x, the transmission control apparatus 100 controls the transmission while maintaining a reference gear-shift pattern (S220).

The transmission control apparatus 100 may not return the corrected gear-shift pattern to the previous gear-shift pattern immediately after it is determined in process S200 that the vehicle 10 completely passes through the curve, but may return the corrected gear-shift pattern to the previous gear-shift pattern according to an outcome of determining whether a continuous curve is present or not.

Referring to FIG. 9, when the vehicle 10 completely passes through the curve (S310), the transmission control apparatus 100 determines whether the next curve is present within a reference distance. When no curve is present within the reference distance (S320), the transmission control apparatus 100 determines that no continuous curve is present, and returns the corrected gear-shift pattern to the previous gear-shift pattern according to the process S210.

When it is determined in process S320 that the next curve is present within the reference distance, the transmission control apparatus 100 determines whether the vehicle speed is higher than or equal to a reference speed. When the vehicle speed is lower than the reference speed (S330), the transmission control apparatus 100 determines that no continuous curve is present, and returns the corrected gear-shift pattern to the previous gear-shift pattern according to the process S210.

Meanwhile, when the determination result in process S320 shows that a curve is present within the reference distance and the determination result in process S330 shows that the vehicle speed is higher than or equal to the reference speed, the transmission control apparatus 100 maintains the corrected gear-shift pattern until the vehicle 10 enters the second curve (S340).

When the vehicle 10 enters the second curve (S350), the transmission control apparatus 100 performs processes after S160 of FIG. 8 again.

Figure 10:
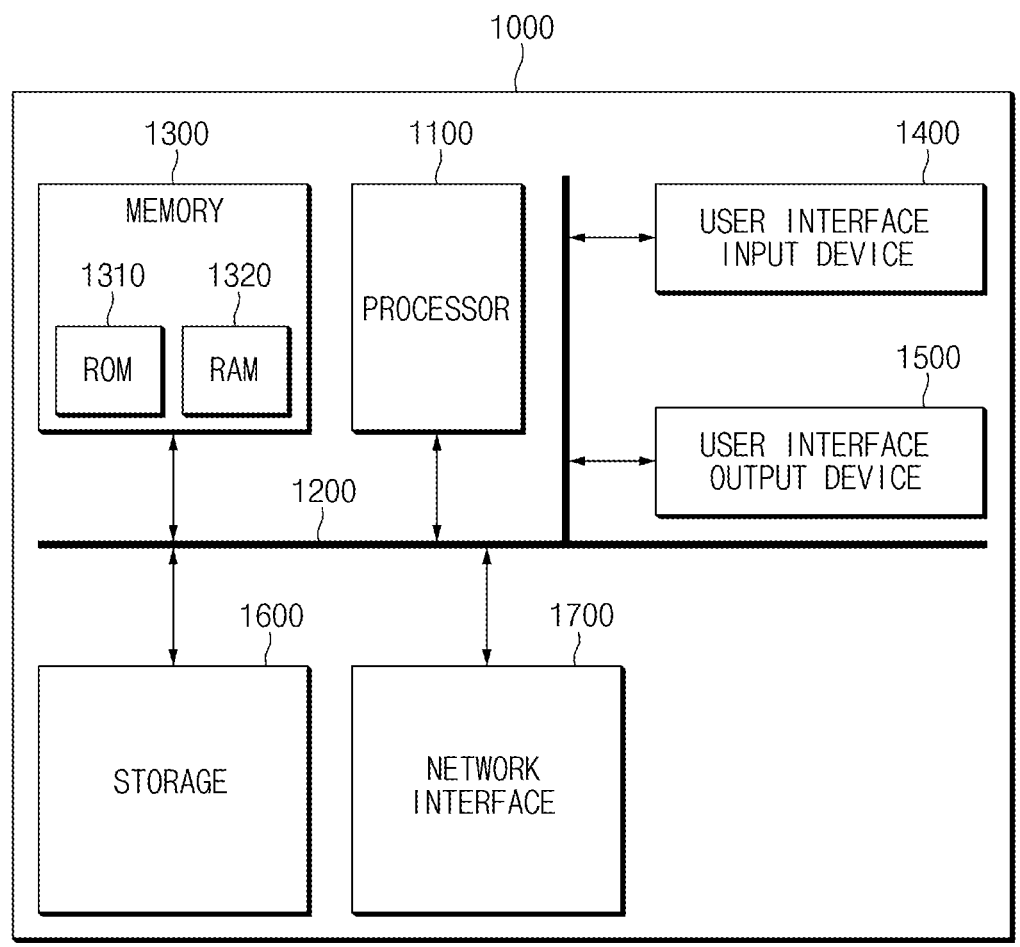
FIG. 10 is a view exemplarily illustrating a computing system for executing a method according to an exemplary embodiment of the present invention.

FIG. 10 is a view exemplarily illustrating a computing system for executing a method d according to an exemplary embodiment of the present invention.

Referring to FIG. 10, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present invention, the transmission control apparatus and method corrects the gear-shift pattern according to the lateral acceleration predicted based on the speed of the vehicle and the curvature of the curve ahead of the vehicle, improving an engine brake effect and re-acceleration responsiveness as well as facilitating the vehicle to stably travel along the curve.

Furthermore, according to an exemplary embodiment of the present invention, the transmission control apparatus and method interrupts the control of the transmission in the OFF state of the accelerator pedal before the vehicle enters the curve, preventing an up-shift during travel of the vehicle along the curve.

Hereinabove, although the present invention has been described with reference to exemplary embodiments and the accompanying drawings, the present invention is not limited thereto, but may be variously modified and altered by those skilled in the art to which an exemplary embodiment of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a transmission of a vehicle, the apparatus including:
   a determination device configured to determine when a curve is present within a predetermined distance ahead of the vehicle, based on information regarding a road ahead of the vehicle;
   a calculation device configured to determine a predicted lateral acceleration of the vehicle based on information regarding the curve and information regarding a state of the vehicle and to determine a pattern correction coefficient based on the predicted lateral acceleration determined;
   a pattern correction device configured to correct a predetermined gear-shift pattern based on the pattern correction coefficient; and
   a controller configured to control the transmission based on the corrected gear-shift pattern upon determining that the vehicle enters the curve.

2. The apparatus of claim 1, wherein the determination device is configured to determine when the curve satisfies a predetermined curve condition, based on a sectional distance and curvature information related to the curve.

3. The apparatus of claim 2, wherein the determination device is configured to determine when a driving situation of the vehicle satisfies an up-shift prohibition condition, based on vehicle speed information upon determining that the curve satisfies the predetermined curve condition.

4. The apparatus of claim 3, wherein the controller is configured to interrupt the control of the transmission in an OFF state of an accelerator pedal upon determining that the driving situation of the vehicle satisfies the up-shift prohibition condition.

5. The apparatus of claim 2, wherein the determination device is configured to determine when the vehicle reaches a gear-shift point before arriving at a start point of the curve, upon determining that the curve satisfies the predetermined curve condition.

6. The apparatus of claim 5, wherein the gear-shift point is a point in which the vehicle is predicted to reach at predetermined time before reaching the start point of the curve.

7. The apparatus of claim 5, wherein the determination device is configured to determine the predicted lateral acceleration of the vehicle based on a speed of the vehicle at a point in which the vehicle is predicted to reach at predetermined time before reaching the gear-shift point and a curvature of the curve, upon determining that the vehicle reaches the gear-shift point.

8. The apparatus of claim 1, wherein the determination device is configured to determine the pattern correction coefficient based on a difference between the predicted lateral acceleration and a lower reference value of a lateral acceleration and a difference between the lower reference value and an upper reference value of the lateral acceleration.

9. The apparatus of claim 1, wherein the pattern correction coefficient is defined to be a value between 0 and 1.

10. The apparatus of claim 9, wherein the gear-shift pattern is determined to be a first gear-shift pattern based on a normal mode upon determining that the pattern correction coefficient is 0, a second gear-shift pattern based on a sports mode upon determining that the pattern correction coefficient is 1, or a third gear-shift pattern based on the curve upon determining that the pattern correction coefficient is greater than 0 and smaller than 1.

11. The apparatus of claim 10, wherein the pattern correction device is configured to move a current gear-shift pattern with respect to the first gear-shift pattern by a value provided by multiplying a difference between the second gear-shift pattern and the first gear-shift pattern by the pattern correction coefficient, upon determining that the gear-shift pattern is the third gear-shift pattern.

12. The apparatus of claim 1, wherein the controller is configured to return the corrected gear-shift pattern to a previous gear-shift pattern upon determining that the vehicle completely passes through the curve.

13. The apparatus of claim 1, wherein the determination device is configured to determine when a continuous curve is present in the road ahead of the vehicle, upon determining that the vehicle completely passes through the curve.

14. The apparatus of claim 13, wherein the determination device is configured to determine that the continuous curve is present in the road ahead of the vehicle, upon determining that a following curve is present within a reference distance and a speed of the vehicle is higher than or equal to a reference speed after the vehicle passes through the curve.

15. The apparatus of claim 14, wherein the controller is configured to maintain a corrected gear-shift pattern upon determining that the continuous curve is present in the road ahead of the vehicle.

16. The apparatus of claim 14, wherein the controller is configured to return the corrected gear-shift pattern to a previous gear-shift pattern upon determining that no continuous curve is present in the road ahead of the vehicle.

17. The apparatus of claim 1, further including:
   a communication device configured to receive the information regarding the curve in the road ahead of the vehicle, from a navigation system.

18. A method of controlling a transmission of a vehicle, the method including:
   determining when a curve is present within a predetermined distance ahead of the vehicle, based on information regarding a road ahead of the vehicle;
   determining predicted lateral acceleration of the vehicle based on information regarding the curve and information regarding a state of the vehicle and determining a pattern correction coefficient based on the predicted lateral acceleration determined;
   correcting a predetermined gear-shift pattern based on the pattern correction coefficient; and
   controlling the transmission based on a corrected gear-shift pattern upon determining that the vehicle enters the curve.

19. The method of claim 18, wherein the determining includes:
   determining when the curve satisfies a predetermined curve condition, based on a sectional distance and curvature information related to the curve.

20. The method of claim 18, further including:
   determining when a driving situation of the vehicle satisfies an up-shift prohibition condition, based on vehicle speed information upon determining that the curve satisfies a predetermined curve condition; and interrupting the control of the transmission in an OFF state of an accelerator pedal upon determining that the driving situation of the vehicle satisfies the up-shift prohibition condition.

21. The method of claim 18, wherein the determining the predicted lateral acceleration of the vehicle includes:
determining the predicted lateral acceleration of the vehicle based on a speed of the vehicle at a point in which the vehicle is predicted to reach at predetermined time before reaching a gear-shift point and a curvature of the curve, upon determining that the vehicle reaches the gear-shift point before arriving at a start point of the curve.

22. The method of claim 18, further including:
determining when a continuous curve is present in the road ahead of the vehicle, upon determining that the vehicle completely passes through the curve; and
maintaining the corrected gear-shift pattern upon determining that the continuous curve is present in the road ahead of the vehicle and returning the corrected gear-shift pattern to a previous gear-shift pattern upon determining that no continuous curve is present in the road ahead of the vehicle.

23. The method of claim 18, further including:
receiving the information regarding the curve in the road ahead of the vehicle, from a navigation system before determining when the curve is present within the predetermined distance ahead of the vehicle, based on the information regarding the road ahead of the vehicle.

\* \* \* \* \*